April 24, 1956

A. F. BUJAN 2,743,400

ELECTROLYTIC DEVICES

Filed May 29, 1951

Inventor
Albert F. Bujan
By George F. Mueller
Attorney

United States Patent Office 2,743,400
Patented Apr. 24, 1956

2,743,400

ELECTROLYTIC DEVICES

Albert F. Bujan, Waukegan, Ill., assignor to Fansteel Metallurgical Corporation, North Chicago, Ill., a corporation of New York Application May 29, 1951, Serial No. 228,932

5 Claims. (Cl. 317—230)

This invention relates to electrolytic devices and specifically to electrolytic condensers.

Electrolytic condensers are commonly formed of aluminum or tantalum, the aluminum being the most commonly used metal because of its relatively low cost. Tantalum has been termed the ideal material for use in the fabrication of electrolytic condensers because of its extremely high resistance to chemical attack by a great number of electrolytes. Aluminum, on the other hand, is satisfactory for use with relatively few electrolytes.

Where aluminum is employed as the anode material, the anode may be formed of a cast aluminum body, an etched aluminum foil or a sprayed aluminum mass. Etching of the foil and spraying of the aluminum are utilized so as to increase the active surface of the electrode and thereby obtain a greater capacity per unit weight of metal than is obtainable by the use of a solid body of the metal.

Where tantalum is employed as the anode material, the anode is advantageously formed of a porous mass or body of tantalum so as to provide a relatively large surface area per unit of weight of the metal. There is no method known whereby tantalum can be sprayed, and etching of the tantalum foil is not commercially feasible because of the metal's high resistance to chemical attack. The porous body may be formed by pressing the metal powder and sintering under such conditions that the powder particles become tacked or fritted together without substantially reducing the porosity of the mass or body.

The principal purpose of the present invention is to provide an electrolytic condenser structure utilizing porous tantalum electrodes.

Further objects and advantages of this invention will become apparent from the following description and claims.

Figure 1:
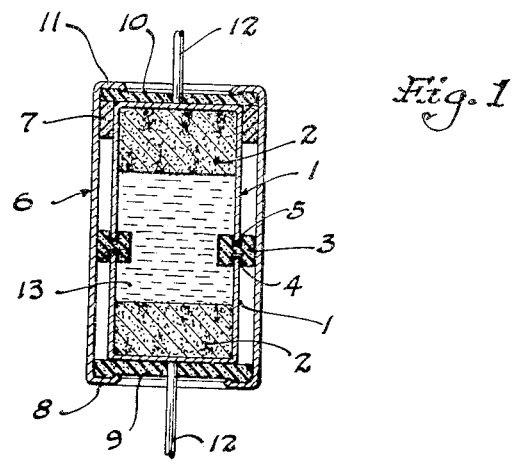
Fig. 1 is a sectional elevational view of an electrolytic condenser formed in accordance with this invention.

In the condenser illustrated in Fig. 1, each of the condenser electrodes consists of a tantalum container 1 having a porous tantalum liner 2 for the closed end of the container integrally secured thereto. The container may be formed by a drawing operation and both electrodes are identical, thereby requiring but a single set of dies. In forming the electrode, the desired quantity of tantalum powder is pressed directly in the container and the element then subjected to a sintering treatment. During the sintering treatment, the powder particles become fritted or welded together and the particles in contact with the container become fritted or welded to the container thereby integrally securing the porous mass to the closed end of the container. It is apparent that the specific size of the container and of the porous liner will be dependent upon the capacity desired of the finished condenser. The dielectric film is formed on the electrode in the conventional manner, that is, by immersing the electrode in a suitable electrolyte and applying the desired potential. The maximum potential which is employed in this forming operation will be dependent upon the voltage at which the condenser is to be employed.

In assembling the condenser, two like electrodes are employed, being mounted with their open ends facing each other. The electrodes are maintained in spaced relationship and are insulated electrically from each other by means of a suitable non-conducting spacing element 3, preferably formed of a resilient insulating material such as rubber or a synthetic rubber. The specific material is selected with respect to its ability to tolerate the electrolyte 13 without deterioration. The spacing and insulating member 3 consists of an annular ring provided with longitudinally opposed annular grooves 4 and 5, the grooves being adapted to receive the open ends of the containers. The spacing and insulating member 3 also serves to seal the electrolyte within the containers.

The assembled electrodes are positioned within a receptacle which is preferably, but not necessarily, formed of a metal capable of resisting attack by the electrolyte. If desired, the receptacle may be formed of an indurated fibrous material. The annular spacing and insulating member 3 also functions as a means to center the assembled electrodes within the receptacle 6. Additional spacing members 7 in the form of annular rings may be positioned adjacent the closed end of each of the electrodes. The receptacle 6 is provided with an internally projecting flange 8 which may be formed by a crimping or rolling operation. A disc or plate 9 is disposed on the flange 8 and the assembled electrodes are placed in the receptacle, being supported by the disc 9. The disc is formed of an insulating material such as a hard synthetic resin or a resilient material such as rubber or a synthetic rubber. A like insulating disc 10 is positioned over the opposite electrode and the assembled electrodes permanently sealed within the receptacle 6 by crimping or rolling the open end of receptacle 6 over the insulating disc 10, as at 11. Sufficient pressure is applied during the crimping or rolling operation so as to place the insulating and spacing member 3 under compression thereby effectively sealing the electrolyte within the electrodes. Each of the electrodes may be provided with a lead 12 welded or brazed to the electrode.

Figure 2:
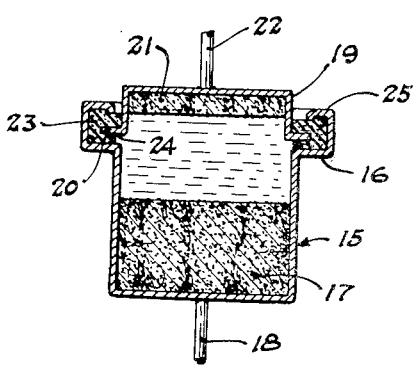
Fig. 2 is a sectional elevational view of another form of an electrolytic condenser of my invention.

In the condenser illustrated in Fig. 2, the electrodes are shown of different size. One of the electrodes consists of a tantalum container 15 provided with a shoulder 16 adjacent its open end. The closed end of the container is provided with an integrally secured lining 17 of porous tantalum formed as described hereinabove. A lead wire 18 may be secured to the container as by welding. The other electrode consists of a tantalum container or cap 19 having an outwardly extended flange 20 at its open end. This container is also provided with a porous tantalum liner 21 at its closed end. Lead wire 22 may be secured to the container 19 as by welding or brazing.

In assembling the electrodes, a resilient insulating member in the form of an annular ring 23 is provided with an internal annular groove 24 positioned about the flange 20, the flange being received by the internal groove 24. Container 15 is filled with the electrolyte and the container 19 and insulating member 23 are positioned on shoulder 16 of container 15. The open end of container 15 is then crimped or rolled over the annular spacing ring 23, as shown at 25, to seal the condenser. It is apparent that the size of the containers and of the porous liners will be determined by the desired capacity.

Figure 3:
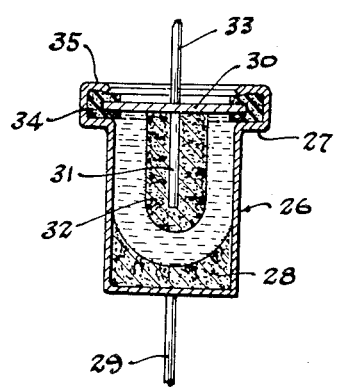
Fig. 3 is a sectional elevational view of a further form of electrolytic condenser of this invention.

Although the condensers described hereinbefore are formed from electrodes comprising a tantalum container or cup having a porous tantalum liner integrally secured to the closed end of the container, one of the electrodes may be formed as described and claimed in my copending application Serial No. 228,931, filed May 29, 1951 and as illustrated in Fig. 3. One of the electrodes consists of a tantalum container 26 provided with a shoulder 27 adjacent its open end and with a porous tantalum liner 28 integrally secured to the closed end of the container. A lead wire 29 may be secured to the container. The other electrode consists of a tantalum disc 30 to which there is secured a tantalum supporting wire 31. A porous tantalum body 32 is integrally secured to the supporting wire 31. A lead wire 33 may be secured to the opposite face of the disc 30. The disc 30 is secured to the open end of the container 26 by a grommet 34 having an internal annular groove which receives the peripheral portion of the disc. The grommet is disposed on shoulder 27 and maintained in position by crimping or rolling the open end portion of container 26 as at 25.

The porous tantalum liner 28 is formed with its upper surface concave as shown in Fig. 3. The porous tantalum body 32 terminates in a convex or semispherical dome. The concave surface of the liner 28 and the convex surface of the dome are preferably concentric so as to provide a uniform path between the electrodes at all points. Such structure is advantageous in reducing the internal resistance of the condenser.

As shown in Fig. 1, each of the electrodes are of identical size. The condenser of Fig. 2 is provided with one electrode of appreciably greater effective area than the other. The condenser of Fig. 3 may be provided with electrodes of the same effective area. It is apparent that the electrodes of the condenser of Figs. 1 and 3 need not be identical and that the electrodes of the condenser of Fig. 2 may be substantially identical. The relative size of the electrodes of either type of construction will be dependent upon the service to which the condenser will be subjected. Where the condenser is to be used for alternating current applications, the condenser should be of a non-polarized type, that is, both electrodes should be of substantially the same capacity or possess substantially the same active surface area. Polarized types of condensers, that is, condensers for direct current applications, are preferably provided with an anode having an appreciably greater active surface area or capacity than the cathode electrode.

I claim:

1. An electrolytic condenser comprising two tantalum containers, each of the containers being closed at one end thereof and open at the other end, said containers being positioned so that the inner surfaces of the closed ends are disposed in face to face relationship, a porous sintered tantalum liner for the closed end of each of the containers welded thereto, a resilient insulating member positioned between the open ends of the containers adapted to seal the condenser and means for maintaining the containers in fixed relationship to each other.

2. An electrolytic condenser comprising a tubular receptacle, two tantalum containers disposed within the receptacle, each of the containers being closed at one end thereof and open at the other end, said containers being positioned so that the inner surfaces of the closed ends are disposed in face to face relationship, a porous sintered tantalum liner for the closed end of each of the containers welded thereto, a resilient insulating member positioned between the open ends of the containers adapted to seal the condenser and means for retaining the containers in fixed relationship to each other within the receptacle.

3. An electrolytic condenser comprising a tubular metallic receptacle, internally projecting flanges at each end of the receptacle, an insulating disc disposed on each of the flanges, a tantalum container disposed on each of the flanges, each of the tantalum containers being closed at one end thereof and open at the other end, said containers being positioned so that the inner surfaces of the closed ends are disposed in face to face relationship, a porous sintered tantalum liner for the closed end of each of the containers welded thereto, an electrolyte within the containers and a resilient insulating member positioned between the open ends of the containers adapted to seal the containers.

4. An electrolytic condenser comprising a first tantalum container closed at one end, a porous tantalum liner for the closed end of the container integrally secured thereto and a shoulder adjacent the open end of the container, a second tantalum container closed at one end, a porous sintered tantalum liner for the closed end of the container welded thereto and an outwardly extending flange at the open end of the second mentioned container, a resilient insulating grommet encompassing the flange on the second mentioned container and disposed on the shoulder of the first mentioned container and means for retaining the grommet on the shoulder.

5. An electrolytic condenser comprising two tantalum containers, each of the containers being closed at one end thereof and open at the other end, said containers being positioned so that the inner surfaces of the closed ends are disposed in face to face relationship, a porous sintered tantalum liner for the closed end of each of the containers welded thereto, a resilient insulating member positioned between the open ends of the containers adapted to seal the condenser, means for maintaining the containers in fixed relationship to each other, there being a space between said porous tantalum liners, and an electrolyte within said containers filling the space between said porous tantalum liners.

References Cited in the file of this patent

UNITED STATES PATENTS

| | | |
|---|---|---|
| 2,241,095 | Marvin | May 6, 1941 |
| 2,283,723 | Clark | May 19, 1942 |
| 2,299,228 | Gray | Oct. 20, 1942 |
| 2,299,667 | Waterman | Oct. 20, 1942 |
| 2,332,746 | Olt | Oct. 26, 1943 |
| 2,368,688 | Taylor | Feb. 6, 1945 |
| 2,372,607 | Schwarkopf | Mar. 27, 1945 |
| 2,463,316 | Ruben | Mar. 1, 1949 |
| 2,488,731 | Lambert | Nov. 22, 1949 |
| 2,491,284 | Sears | Dec. 13, 1949 |
| 2,497,496 | Gooskens | Feb. 14, 1950 |
| 2,536,696 | Ruben | Jan. 2, 1951 |
| 2,617,863 | Stinson | Nov. 11, 1952 |

FOREIGN PATENTS

| | | |
|---|---|---|
| 561,820 | Great Britain | June 6, 1944 |